Nov. 7, 1967     G. R. COY     3,350,925
TESTING ASSEMBLY FOR TESTING A WELD BEAD OR THE LIKE
Filed June 30, 1964     4 Sheets-Sheet 1

INVENTOR.
GERALD R. COY
BY Lester N. Clark
ATTORNEY

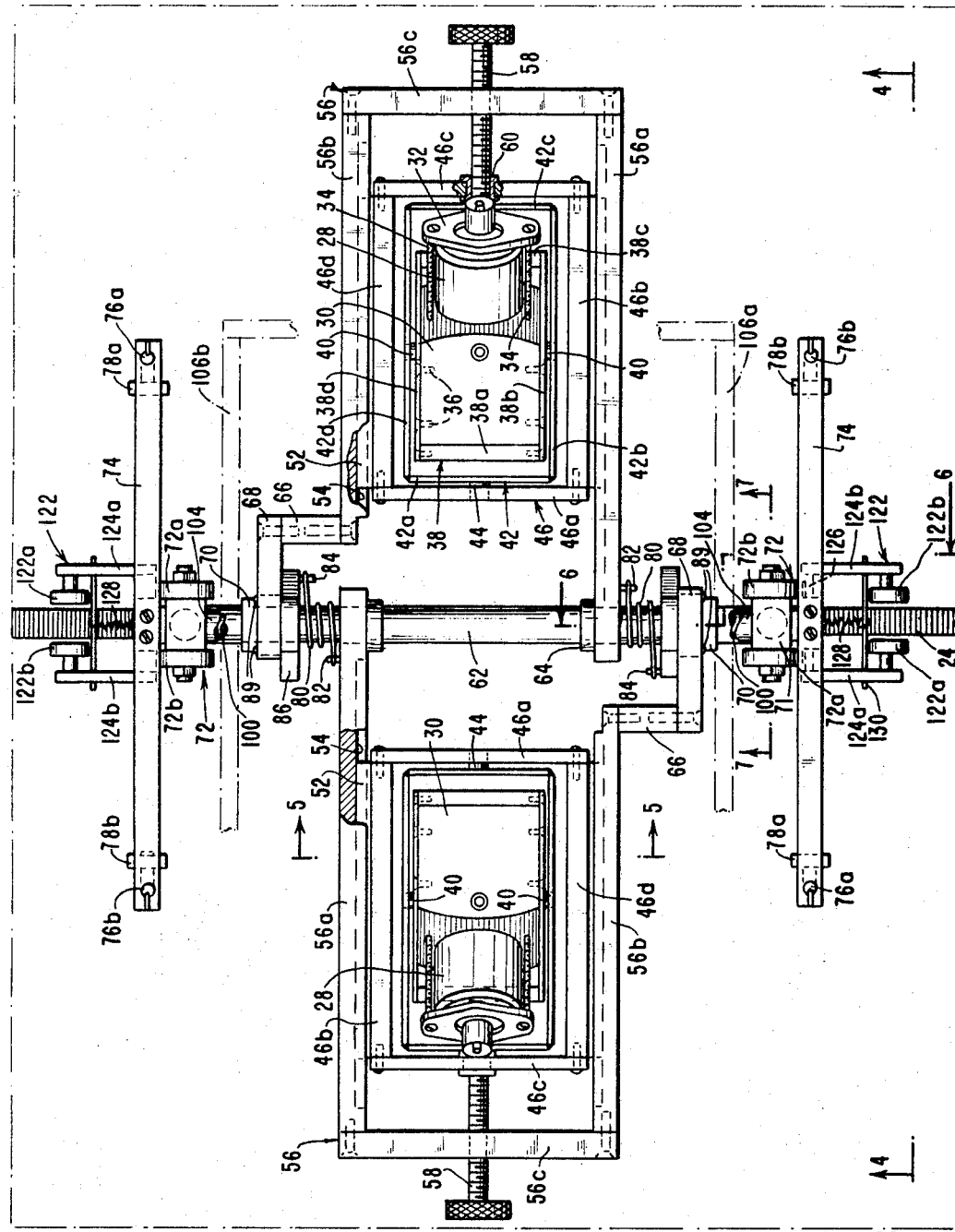

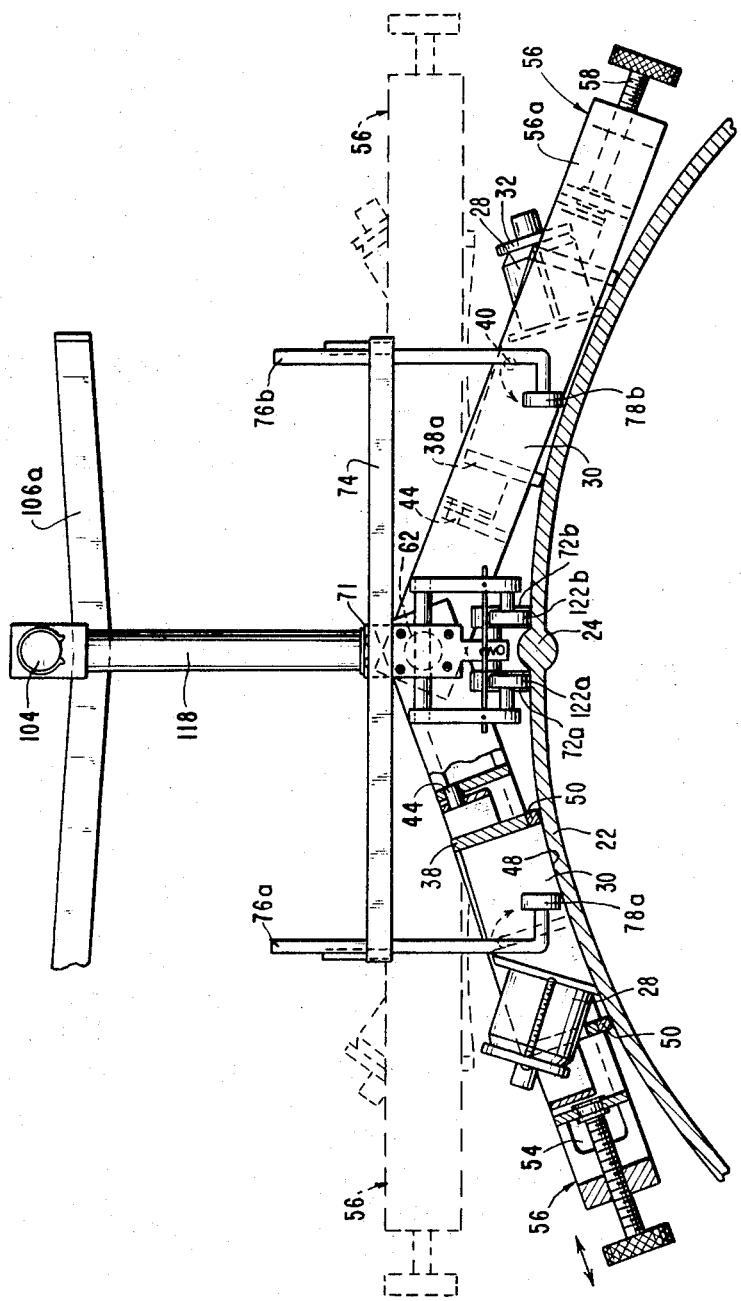

Nov. 7, 1967  G. R. COY  3,350,925
TESTING ASSEMBLY FOR TESTING A WELD BEAD OR THE LIKE
Filed June 30, 1964  4 Sheets-Sheet 4
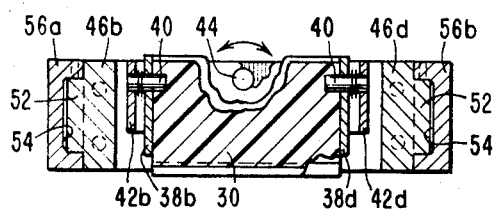
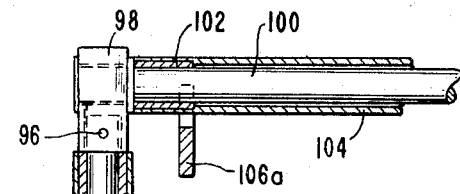
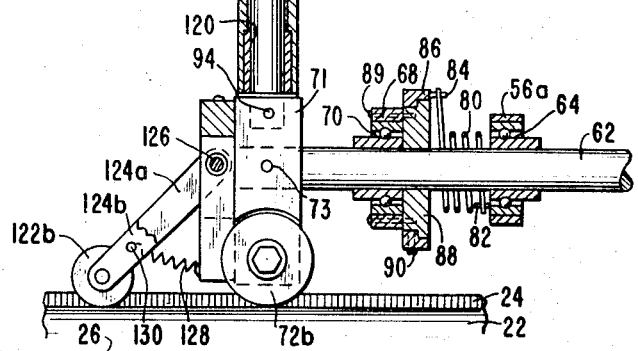
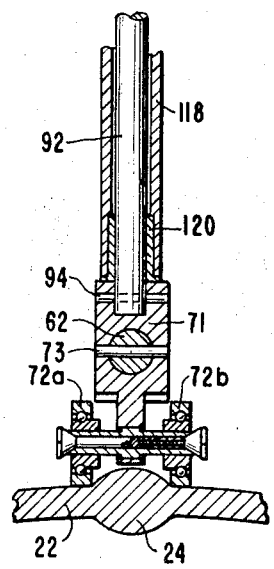
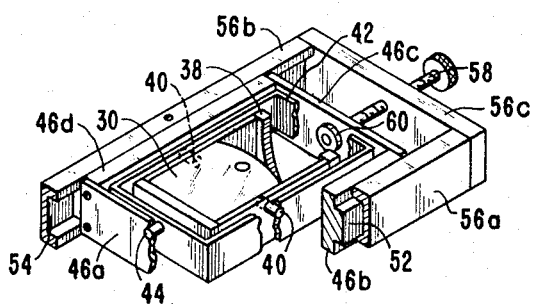
INVENTOR.
GERALD R. COY
BY
Lester W Clark
ATTORNEY United States Patent Office 3,350,925
Patented Nov. 7, 1967

3,350,925
TESTING ASSEMBLY FOR TESTING A
WELD BEAD OR THE LIKE
Gerald R. Coy, Chagrin Falls, Ohio, assignor to Republic Steel Corporation, Cleveland, Ohio, a corporation of New Jersey
Filed June 30, 1964, Ser. No. 379,255
17 Claims. (Cl. 73—71.5)

ABSTRACT OF THE DISCLOSURE

A mounting assembly for mounting testing transducers such as ultrasonic transducers in fixed positions with respect to a weld bead. A carriage assembly rides on the article to be tested and has rollers mounted on both sides of the weld bead. Transducers are pivotally mounted on opposite sides of a shaft on the carriage assembly by frame members including gimbal mountings to permit adjustment of the transducers in any direction. The article and carriage assembly are given relative movement, the tracking of the weld bead being achieved by the rollers which embrace the bead. The frame members pivotally mounted about the shaft of the carriage assembly are supported by springs wrapped about the shaft with tension adjusted so that the weight of the transducers is applied through the springs to the shaft. Outrigger arms are secured to the carriage assembly having rollers at ends thereof bearing against the article tested. Additional rollers are incorporated in the carriage assembly spring biased to initially engage the weld bead and to position the carriage assembly with respect to the weld bead as the carriage assembly is moved from a remote position to a testing position adjacent the weld bead. Rotatable sleeves form part of the carriage assembly to be engaged by an arm member. The sleeves permit the arm member to move the carriage assembly, both along the weld bead and away from the weld bead, without any binding. Notches in the arm provide for a secure carrying position of the assembly by the arm.

This invention relates to testing apparatus and, more particularly, to apparatus for testing the weld bead of a fusion welded pipe.

Pipe is often formed by means of fusion welding, so that the finished pipe includes a weld bead along the length thereof. During the course of manufacture, it is necessary to test the bead to determine that there are no flaws therein. The copending application of Andrew Stanya for Method and Apparatus for Ultrasonic Testing, Ser. No. 259,595 filed Feb. 19, 1963, now Patent No. 3,274,822, and assigned to the assignee of the present application, discloses an ultrasonic testing arrangement for fusion welded pipe. The present invention is directed to a mounting assembly for accurately mounting, with respect to a weld bead under test, a testing device, such as the ultrasonic transducers employed in the copending Stanya application.

Assemblies for mounting the testing transducer of equipment to test weld beads are well known. Many mounting assemblies incorporate a fixed track with respect to the article to be tested. A disadvantage of such an arrangement is that deviations in the weld bead fom a straight line cause improper indications to be given by the test equipment, inasmuch as the position of the weld bead with respect to the transducer changes. Mounting assemblies have been employed which provide for oscillation of the testing transducer generally about the presumed position of the weld bead to account for such deviations of the bead from a straight line. A disadvantage of this type of arrangement is that the oscillating movement of the testing transducer requires additional signal equipment to compensate for the oscillations. Further, the transducer movement may not be sufficient to encompass all bead deviations from a straight line path.

Other mounting assemblies have been utilized in the past involving the variable mounting of a testing transducer on an article, such as a pipe, to compensate for deviations in the general shape of the article from the ideal shape. A disadvantage of this arrangement is that the deviations in the shape of the article may or may not change the relative position of the weld bead and the transducer.

It is accordingly an object of the present invention to provide a mounting assembly for a testing member used to test the weld bead of a welded article, such that the testing member is accurately positioned with respect to the weld bead.

This object is achieved in the present invention by providing a mounting assembly which effectively tracks the weld bead so that the testing member is always positioned accurately with respect to the bead, notwithstanding deviations of the bead from a straight line path. This is provided in a preferred embodiment of the present invention by a carriage assembly which rides on the article to be tested, and which includes rollers mounted on both sides of the weld bead. Relative movement between the article and the carriage assembly is provided to test the entire weld bead, typically by moving the article. The assembly moves laterally as required, to remain in a fixed position with respect to the center of the portion of the weld bead under test, by virtue of the rollers.

The carriage assembly includes a shaft which has one or more frame members mounted thereon, each for carrying a testing transducer at the side of the weld bead. Each frame member is mounted for rotation about the shaft, and the transducer is mounted in a gimbal arrangement to permit adjustment of the transducer in any direction. In this fashion the transducer may be accurately positioned against the article in testing the weld bead. Additionally, each frame member is supported almost entirely by a spring wrapped about the shaft. The spring tension is adjusted so that the transducer rides against the article to be tested, but not with its full weight. In this manner a large portion of the weight of the frame member and transducer is transferred by the spring to the shaft above the weld bead. This added weight over the weld bead aids in stabilizing the system and in tracking the bead.

One or more outrigger arms are secured to the carriage assembly transversely to the weld bead, and each includes rollers at the ends thereof which aid in the positioning of the carriage assembly on the article to be tested. Additional rollers may be incorporated in the carriage assembly, which are yieldably biased to a position closer to the weld bead than any other rollers and which are spaced on opposite sides of the weld bead. In this fashion, as the carriage assembly is moved to a testing position adjacent a weld bead, these rollers initially contact the article to be tested for proper positioning of the carriage assembly.

A rotatable sleeve is also secured to the carriage assembly which is adapted to be engaged by notched arms to move the entire assembly away from the article to be tested. The rotatable mounting of this sleeve ensures that when the assembly is moved away from the article the sleeve will move freely into the notches, leaving the assembly in the proper position to be lowered onto another article to be tested. A similar rotatable sleeve is incorporated to permit the carriage assembly to move freely laterally and to prevent the assembly from binding against a fixed portion of the apparatus when tracking a weld bead.

A more complete understanding of the invention and its objects and features will be obtained by consulting the following detailed description, which includes the appended drawings. In the drawings:

FIG. 3 is an enlarged plan view of the mounting assembly shown in FIG. 1;

FIG. 4 is a front view of the mounting assembly shown in FIG. 3, looking in the direction of the arrows 4—4 of that figure;

FIGS. 5, 6 and 7 are sectional views of the apparatus shown in FIG. 3, taken generally along the section lines 5—5, 6—6 and 7—7, respectively, in FIG. 3 and looking in the directions of the corresponding arrows in that figure; and FIG. 8 is a perspective view of a frame member for providing a gimbal mounting of a testing transducer.

Figure 1:
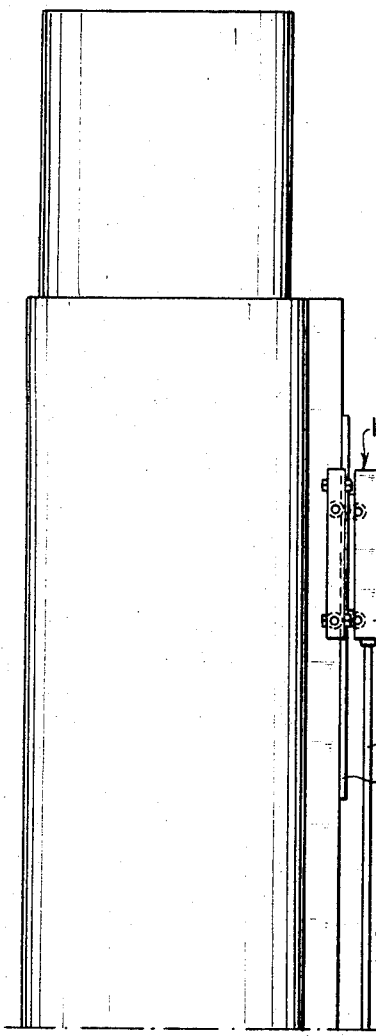
FIG. 1 is a front view of a mounting assembly for a weld bead testing arrangement in accordance with the invention.

Referring to FIG. 1, a mounting assembly 20 in accordance with the invention is shown positioned with respect to a pipe 22 which is fusion welded to produce a longitudinal weld bead 24 to be tested for flaws. The assembly 20 is adapted to ride on the pipe 22 which is moved underneath the assembly by any suitable track and drive arrangement (not shown). The pipe advantageously is moved in the direction of the arrow 26 in FIG. 6, and during such movement two ultrasonic testing transducers 28 shown in FIGS. 1, 3 and 4 generate ultrasonic waves which are reflected within the pipe 22 and bead 24. The transducers 28 may advantageously form a part of the testing arrangement described in the copending Stanya application.

The mounting of the transducers 28 is shown best in FIG. 3. Each transducer is coupled to a plastic wedge 30 by a clamp 32, which is secured to the wedge by screws 34. The wedge 30 is in turn secured by screws 36 to a first box frame 38 formed with sides 38a, 38b, 38c and 38d. The first box frame 38 is coupled by pins 40 to a second box frame 42 formed with sides 42a, 42b, 42c and 42d. The box frame 42 is in turn coupled by pins 44 to an outer slide frame 46 formed with sides 46a, 46b, 46c and 46d.

FIG. 8 shows in perspective the wedge 30, the first and second box frames 38 and 42, respectively, and the outer slide frame 46. It will be noted from this figure and FIG. 5 that the pins 40 pivotally couple the first and second box frames together along an axis which is at right angles to the axis of the pins 44 coupling together the second box frame and the outer slide frame. Hence the wedge 30, containing the transducer 28, is in a gimbal mounting and is free to assume any position so as to be mounted properly against the pipe 22, as shown in FIG. 4.

It will be noted from FIG. 4 that the bottom portion 48 of the shoe is curved with the same degree of curvature as the pipe 22. It will also be noted from that figure that the first box frame 38 carrying the wedge 30 includes a pair of wear shoes 50 which engage the surface of the pipe 22 and provide a wearing surface to take most of the frictional engagement with the pipe, preventing wearing of the bottom edge 48 of the wedge.

As will be noted from FIGS. 5 and 8, the sides 46b and 46d of the outer slide frame 46 are formed with tongues 52. These tongues slide in grooves 54 included in side supports 56a and 56b of a support frame 56. The support frame 56 includes a spacer bar 56c which is threaded to receive a threaded shaft 58. The shaft 58 passes through side 46c of the outer slide frame 46 and is free to rotate therein by virtue of a flanged bushing 60 secured to the end of the shaft 58 (see also FIG. 3). Rotation of the shaft 58 thus threads the shaft through the spacer bar 56c of the support frame 56 and causes the outer slide frame 46 to move along with the end of the shaft. The outer slide frame 46 is accordingly moved within the support frame 56 to position the wedge 30 and transducer 28 at any peripheral position on the pipe 22, as shown in FIG. 4.

The support frames 56 that carry the transducers 28 are each mounted for pivotal movement about a center shaft 62, as shown in FIG. 3. Each frame side support 56a is mounted directly on the shaft 62 by a bearing 64 (FIG. 6). The frame side support 56b is connected through a link 66 to a support arm 68 which is pivotally mounted to the shaft 62 by a bearing 70 (FIG. 6).

The pivotal support for the frames 56 about the center shaft 62, together with the gimbal mounting of the wedges 30 to which the transducers 28 are coupled and the slide support in the frames 56, provides an arrangement which permits the mounting of the transducers at any position along a pipe, and permits the assembly to be used on pipes of different diameter with appropriate wedges 30.

The center shaft 62 is supported above the pipe 22 by two pairs of tracking rollers 72 spaced along the weld bead 24 at the ends of the shaft. As shown in FIG. 7, each roller pair is coupled to the support member 71 attached to the end of the center shaft 62 by pin 73, and includes rollers 72a and 72b which are positioned on both sides of the weld bead 24. As the pipe 22 is moved beneath the carriage assembly 20, the rollers 72 track the weld bead and ensure that the shaft 62 is always positioned above the weld bead regardless of transverse variations of the centerline position of the weld bead on the pipe. This accurate positioning of the shaft 62 in turn accurately positions the transducers 28 with respect to the weld bead to ensure proper testing.

As shown in FIGS. 3 and 4, support members 71 attached to the ends of the shaft 62 also have attached thereto outrigger arms 74. Downwardly extending rods 76a and 76b are attached to the ends of each outrigger arm 74, as shown best in FIG. 4. Each rod has its lower end bent over at right angles to provide an axle for one of a pair of rollers 78a and 78b, which ride along the pipe 22 with clearance of sufficient amount to prevent tipping without subtracting any significant weight from rollers 72a and 72b. The rollers 78a and 78b are spaced at sufficient lateral distances from the weld bead 24 to provide lateral support for the entire carriage assembly 20 and to prevent the assembly from tipping.

To ensure proper tracking of the weld bead 24 by the carriage assembly 20 as the pipe 22 is moved under the assembly, provision is made to ensure that most of the weight of the entire assembly is positioned over the weld bead. To this end, two springs 80 (FIG. 3) are employed, each of which is wrapped about the shaft 62 and secured at one end to a pin 82 on one of the side supports 56a and at its other end to a pin 84. As shown best in FIG. 6, each pin 84 is fastened to a collar 86 which is mounted for rotation about a retaining ring 88. The retaining ring 88 is fastened to the support arm 68 associated with the frame 56 on the side of the shaft 62 opposite from the frame 56 to which the pin 82 is connected. The retaining ring 88 may be fastened to the support arm 68 by any suitable means, such as screws 89 shown in FIG. 3. Referring again to FIG. 6, the tension in each of the springs 80 is adjusted by rotating the corresponding collar 86 on its associated retaining ring 88, and then locking the collar in this position by a set screw 90.

In this fashion, referring to FIG. 3, each spring 80 couples the side support 56a of one of the transducer mounting frames 56 to the support arm 68 for the frame 56 on the opposite side of the shaft 62. The tension in the spring is such as to tend to pivot each of the frames 56 upwardly about the shaft 62. The tension should be such, however, that it is slightly less than the combined weight of the fames 56 and all items carried by the frames, i.e., the frames 38, 42 and 46, the wedge 30 and the transducer 28. In this manner, the transducers 28 are not raised away from the pipe 22 but are positioned as shown in FIG. 4 with the wedges 30 against the pipe for testing.

By virtue of the tension in the springs 80, the reaction forces exerted by the springs against the shaft 62 are in a downward direction tending to force the shaft 62 downwardly. Thus almost the entire weight of the transducer-carrying assemblies is effectively transferred to the shaft 62 by the springs, and this aids the carriage assembly 20 in following the weld bead 24. For example, with most of the weight of the entire arrangement placed over the shaft 62, if one of the tracking rollers 72 should start to ride up on the weld bead, the weight of the assembly aids in forcing the roller back down to its proper position at the side of bead.

Each of the support members 71 secured to the ends of the shaft 62 includes a vertical shaft 92 secured thereto by a pin 94 (FIGS. 6 and 7). At the top portion of each shaft 92, a pin 96 secures the shaft to another support member 98. An upper cross shaft 100 is secured to the support members 98 and includes bearings 102 positioned at the ends thereof about which a cylindrical sleeve 104 is free to rotate. The sleeve 104 aids in the raising and lowering of the entire carriage assembly 20 with respect to the pipe 22.

Figure 2:
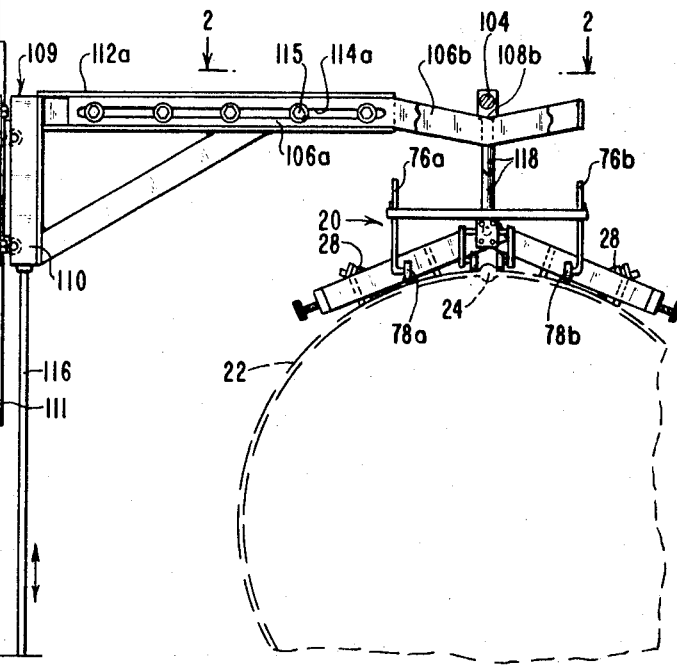
FIG. 2 is a partially cut away plan view of a portion of the apparatus shown in FIG. 1, looking in the direction of the arrows 2—2 of that figure.
Figure 2:
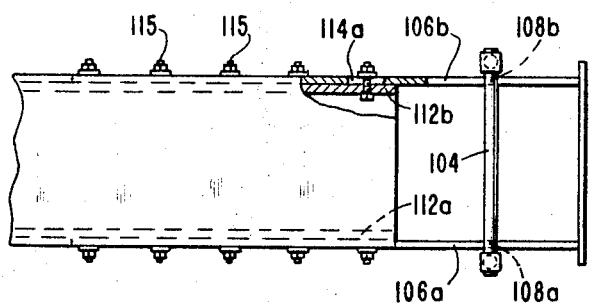

As shown in FIGS. 1 and 2, a pair of arms 106a and 106b extetnd transversely to and underneath the sleeve 104. The arms include notched portions 108a and 108b, respectively, which are adapted to receive the sleeve. The arms 106 are secured to a lifting assembly 109, which includes a frame 110 mounted for vertical movement on a track 111. The frame 110 includes laterally extending arms 112a and 112b against which the arms 106a and 106b, respectively, slide. The arms 106a and 106b include grooves 114a and 114b, respectively, which receive bolts 115 that secure the arms 106 to the arms 112. The lateral position of the arms 106 may be varied by loosening the bolts 115 and sliding the arms 106 along the arms 112, and then tightening the bolts when the proper arm positions have been assumed.

The assembly 109 is raised and lowered along the track 111 by a rod 116 secured to the frame 110. The rod 116 is actuated by any suitable means, such as a hydraulic piston and cylinder arrangement (not shown).

When the carriage assembly 20 is tracking a weld bead 24, the arms 106 are maintained in a lower position by the rod 116 so that they do not engage the sleeve 104, as in FIG. 6. When it is desired to raise the carriage assembly 20 above the pipe 22, the rod 116 is moved upwardly until the arm 106 engage the sleeve 104 and raise the assembly above the pipe. The cylindrical sleeve 104 assumes a position within the notches 108, which is aided by the free rotation of the sleeve. In this manner, the carriage assembly is always raised with the same orientation, notwithstanding any misalignment of the assembly prior to its being raised, and is in the proper position to be lowered onto another pipe to be tested.

A further cylindrical sleeve 118 (FIG. 6), similar to the sleeve 104, is incorporated in connection with each of the vertical shafts 92 coupling together the center shaft 62 and the upper cross shaft 100. Each vertical shaft 92 includes lower bearing 120 and upper bearing 121 about which the associated sleeve 118 is free to rotate. The sleeves 118 are adapted to be engaged by the arms 106 of the lifting assembly 110. Referring to FIG. 6, when the carriage assembly 20 is tracking the weld bead, the arm 106a may ride against the sleeve 118. Any directional changes in the bead can be easily followed by the carriage assembly, since the rotational mounting of the sleeve 118 prevents any frictional engagement from developing between the sleeve and the arm 106a which would tend to inhibit the lateral movement of the carriage assembly.

The carriage assembly 20 includes additional sets of rollers 122 (FIG. 3) positioned at the ends of the center shaft 62. Each roller set includes rollers 122a and 122b positioned on opposite sides of weld bead 24. These rollers are carried by arms 124a and 124b, respectively, which pivot about a shaft 126 carried in the support member 71.

A spring 128 is connected at one end to the support member 71 and at its other end to a rod 130 joining the roller carrying arms 124a and 124b.

Referring to FIG. 6, the spring 128 pivots the roller carrying arms 124a and 124b in a counterclockwise direction about the shaft 126 to urge the rollers 122a and 122b downwardly. When the carriage assembly 20 is raised above the pipe 22, prior to the tracking of a weld bead, the rollers 122a and 122b are in a downward position in which they are closer to the weld bead 24 than any other rollers in the assembly. Hence when the assembly is initially lowered to the pipe 22 to track the weld bead, the rollers 122a and 122b make first contact with the pipe and serve to initially position the carriage assembly 20 in the proper position for tracking the bead. The positioning tolerance is typically ±⅓ the width of the weld bead. The carriage assembly may then be lowered completely, at which point the main tracking rollers 72a and 72b will be in a position against the pipe on opposite sides of the weld bead 24. The rollers 122a and 122b, while serving mainly to initially position the carriage assembly over the weld bead, also serve to aid in tracking the bead as the pipe is tested.

From the description above, it will be noted that a unique weld bead tracking arrangement has been disclosed, which accurately positions one or more testing transducers with respect to a weld bead. The assembly is suitable for operation on pipe of varying diameters by virtue of the multidirectional mounting of the transducers. The assembly is also adapted to present most of its weight over the weld bead, to aid in the tracking of the bead. Further provision is made to ensure the proper orientation of the assembly when it is moved into position to test a pipe, as well as to permit the assembly to move freely laterally to track the bead during a test.

It will be appreciated that the preferred embodiment of the invention set forth above is subject to modifications which will nonetheless come within the spirit of the invention. Accordingly, the scope of the invention is to be determined by the following claims.

What is claimed is:

1. In apparatus for positioning a testing member with respect to a weld bead on an article, the combination comprising a carriage assembly including a shaft and rollers mounting the shaft, and a frame member mounted upon the shaft and carrying the testing member, the rollers being positioned on opposite sides of the weld bead to accurately position the shaft with respect to the weld bead, whereby the testing member is positioned accurately with respect to the weld bead as relative movement is occasioned between the carriage assembly and the article, wherein the frame member comprises first and second inner frames and an outer frame, the outer frame being mounted for pivotal movement about the shaft, the first inner frame carrying the testing member and being pivotally coupled to the second inner frame about a first axis, and the second inner frame being pivotally coupled to the outer frame about a second axis, the first and second axes being substantially perpendicular to each other to provide a gimbal self-aligned mounting for the testing member.

2. Apparatus as recited in claim 1, wherein the mounting of the outer frame for pivotal movement about the shaft is achieved by means comprising a support frame mounted for rotation about the shaft, the outer frame being slidably mounted in the support frame for movement toward and away from the shaft.

3. In apparatus for positioning a testing member with respect to a weld bead on an article, the combination comprising a carriage assembly including a shaft and rollers mounting the shaft, and a frame member mounted upon the shaft and carrying the testing member, the rollers being positioned on opposite sides of the weld bead to accurately position the shaft with respect to the weld bead, whereby the testing member is positioned accurately with respect to the weld bead as relative movement is occasioned between the carriage assembly and the article, wherein the frame member is pivotally mounted on the shaft, and including spring means coupled to the shaft and to the frame member to provide a lifting force tending to pivot the frame member upwardly about the shaft, thereby to effectively transfer the weight of the frame member and testing member carried thereby to the shaft.

4. Apparatus as recited in claim 3, including means for varying the tension of the spring means.

5. In apparatus for positioning a testing member with respect to a weld bead on an article, the combination comprising a carriage assembly including a shaft and rollers mounting the shaft, and a frame member mounted upon the shaft and carrying the testing member, the rollers being positioned on opposite sides of the weld bead to accurately position the shaft with respect to the weld bead, whereby the testing member is positioned accurately with respect to the weld bead as relative movement is occasioned between the carriage assembly and the article, including an outrigger arm coupled to the carriage assembly and positioned transversely with respect to the weld bead, and rollers mounted at the ends of the outrigger arm for supporting the carriage assembly on the article.

6. In apparatus for positioning a testing member with respect to a weld bead on an article, the combination comprising a carriage assembly including a shaft and rollers mounting the shaft, and a frame member mounted upon the shaft and carrying the testing member, the rollers being positioned on opposite sides of the weld bead to accurately position the shaft with respect to the weld bead, whereby the testing member is positioned accurately with respect to the weld bead as relative movement is occasioned between the carriage assembly and the article, including further rollers positioned on opposite sides of the weld bead, and means yieldingly coupling the further rollers to the carriage assembly in an initial position closer to the weld bead than the other rollers so that the further rollers engage the article on opposite sides of the weld bead first when the carriage assembly is moved to a position adjacent the article to be tested.

7. In apparatus for positioning a testing member with respect to a weld bead on an article, the combination comprising a carriage assembly including a shaft and rollers mounting the shaft, and a frame member mounted upon the shaft and carrying the testing member, the rollers being positioned on opposite sides of the weld bead to accurately position the shaft with respect to the weld bead, whereby the testing member is positioned accurately with respect to the weld bead as relative movement is occasioned between the carriage assembly and the article, including a second shaft rotatably mounted on the carrage assembly, and an arm adapted to be raised under the second shaft to engage the second shaft, said arm having a relatively broad, V-shaped notch which receives the second shaft to raise the assembly away from the article being tested and to position the carriage assembly in a fixed position with respect to the arm.

8. Apparatus as recited in claim 7, including a third shaft rotatably mounted on the carriage assembly in position to support the second shaft and in position to be engaged by the notched arm longitudinally with respect to the weld bead under test, the rotational mounting of the third shaft permitting engagement of that shaft by the notched arm without inhibiting the lateral movement of the carriage assembly in tracking a weld bead.

9. In apparatus for positioning testing transducers on opposite sides of a weld bead on an article, the combination comprising a carriage assembly including a shaft, first and second frame members pivotally mounted upon the shaft on opposite sides thereof, first and second sets of rollers mounted at spaced apart positions along the shaft, the rollers in each set being positioned on opposite sides of the weld bead, whereby the testing transducers are positioned accurately with respect to the weld bead as relative movement is occasioned between the carriage assembly and the article.

10. Apparatus as recited in claim 9, including means mounting each of the transducers in its respective frame member for pivotal movement about two axes generally perpendicular to each other.

11. Apparatus as recited in claim 9, including third and fourth sets of rollers mounted at spaced apart positions along the shaft, the rollers in each of the third and fourth sets being positioned on opposite sides of the weld bead, and means yieldingly urging each of the third and fourth sets of rollers in an initial position closer to the weld bead than the first and second sets of rollers so that the third and fourth sets of rollers engage the article on opposite sides of the weld bead first when the carriage assembly is moved to a position adjacent the article to be tested.

12. Apparatus as recited in claim 9, including spring means mounted on the shaft and coupled to the first and second frame members and providing a lifting force tending to pivot the frame members upwardly about the shaft, thereby to effectively transfer the weight of the frame members and testing transducers carried thereby to the shaft.

13. Apparatus for testing a workpiece in the neighborhood of an elongated ridge on the surface thereof, comprising a carriage having a pair of guide rollers, the rollers being laterally spaced by a distance approximately equal to the width of the ridge, so that the carriage may engage the workpiece with the rollers straddling the ridge; a testing device; means on the carriage supporting the testing device in a position spaced laterally from the rollers; a member mounted on said carriage and rotatable about an axis which, when the carriage engages the workpiece, extends transversely with respect to the elongated ridge; means for providing relative movement between the carriage and the workpiece when the carriage engages the workpiece including an arm mounted for relative movement with respect to the workpiece in a direction lengthwise of the ridge, said arm engaging said rotatable member to cause the rotatable member to stay adjacent the arm and hence to move relative to the workpiece in a direction lengthwise of the ridge, said rotatable member rolling on said arm to permit free lateral movement of the carriage under the guidance of the rollers straddling the ridge so that the spacing between the testing device and the ridge remains constant regardless of the lateral variations in the ridge position as the carriage and the workpiece experience relative movement.

14. Apparatus as recited in claim 13, including a second pair of guide rollers, the rollers of the second pair being laterally spaced by a distance approximately equal to the width of the ridge, so that when the carriage engages the workpiece the rollers in each of the two pairs of guide rollers straddle the ridge; a second member mounted on said carriage and rotatable about an axis generally parallel to the axis about which the other member is rotatable; said arm being positioned between the two rotatable members.

15. Apparatus as recited in claim 13, including a sleeve on said carriage engageable by said arm, and means for moving said arm while in engagement with said sleeve so as to shift the carriage between a retracted position spaced from the workpiece and an active position in which the carriage is biased to engage the workpiece.

16. Apparatus for testing a workpiece in the neighborhood of an elongated ridge on the surface thereof, comprising a carriage having a pair of guide rollers, the rollers being laterally spaced by a distance approximately equal to the width of the ridge, so that the carriage may engage the workpiece with the rollers straddling the ridge; a testing device; means on the carriage supporting the testing device in a position spaced laterally from the rollers; a member mounted on said carriage and rotatable about an axis which, when the carriage engages the workpiece, extends longitudinally with respect to the elongated ridge;

and means for shifting the carriage between a retracted position spaced from the workpiece and an active position in which the carriage is biased to engage the workpiece including an arm mounted for relative movement toward and away from the workpiece and adapted to engage the rotatable member, the arm including a broad V-shaped notch whereby as the arm engages the rotatable member to move the carriage the rotatable member rolls along the arm and into the bottom of the notch to position the carriage in a relatively fixed position whenever it is shifted to its retracted position or to its active position.

17. In apparatus for positioning a testing member with respect to a weld bead on an article, the combination comprising a carriage assembly including a shaft and rollers mounting the shaft, the rollers being positioned on opposite sides of the weld bead to accurately position the shaft with respect to the weld bead, and a frame member pivotally mounted upon the shaft at one side thereof and carrying the testing member, whereby the testing member is positioned accurately with respect to the weld bead at one side thereof as relative movement is occasioned between the carriage assembly and the article.

References Cited

UNITED STATES PATENTS

| | | | |
|---|---|---|---|
| 2,799,157 | 7/1957 | Pohlman | 73—67.7 |
| 2,951,365 | 9/1960 | Legrand | 73—67.8 |
| 3,056,286 | 10/1962 | Gibson et al. | 73—67.8 |
| 3,164,714 | 1/1965 | Swan et al. | 219—126 |
| 3,233,449 | 2/1966 | Harmon | 73—71.5 X |
| 3,289,468 | 12/1966 | Van Der Veer et al. | 73—67.8 X |

JAMES J. GILL, *Acting Primary Examiner.*

JOHN P. BEAUCHAMP, *Assistant Examiner.*